AUTOMATIC CURVE FOLLOWER WITH VIBRATING STYLUS

Filed March 12, 1952 3 Sheets-Sheet 1

INVENTOR
H. W. BODE
BY N. S. Ewing
ATTORNEY

May 1, 1956 H. W. BODE 2,744,224

AUTOMATIC CURVE FOLLOWER WITH VIBRATING STYLUS

Filed March 12, 1952

3 Sheets-Sheet 2

INVENTOR
H. W. BODE
BY N. S. Ewing
ATTORNEY

May 1, 1956 H. W. BODE 2,744,224
AUTOMATIC CURVE FOLLOWER WITH VIBRATING STYLUS
Filed March 12, 1952 3 Sheets-Sheet 3

INVENTOR
H. W. BODE
BY N. S. Ewing
ATTORNEY

United States Patent Office 2,744,224

Patented May 1, 1956

2,744,224

AUTOMATIC CURVE FOLLOWER WITH VIBRATING STYLUS

Hendrik W. Bode, Summit, N. J., assignor to Bell Telephone Laboratories, Incorporated, New York, N. Y., a corporation of New York Application March 12, 1952, Serial No. 276,205

5 Claims. (Cl. 318—31)

This invention relates to automatic curve followers and, more particularly, to automatic curve translators, that is, to devices adapted to derive automatically from a graphic representation of a mathematical function a time-varying voltage of the same form.

In the analog computer art there is need for a device that can translate a mathematical function simply and effectively into a corresponding time-varying voltage for use in the computer. One such device, disclosed and claimed in H. C. Rorden application Serial No. 273,749, filed February 27, 1952, makes use of a chart on which one paints an electrically conductive band that has one boundary coincident with a graphic or curvilinear representation of whatever mathematical function is to be translated. The device comprises a stylus which makes contact with the chart and past which the chart is drawn progressively in one coordinate direction, a reversible motor connected to the stylus which directs the stylus reversibly in the other coordinate direction across the chart, and a directional control device for the reversible motor which causes the motor to drive the stylus towards the band when the stylus is not in contact with the band and in the opposite direction when the stylus is in contact with the band, thereby causing the stylus to follow the curve. Rigidly mechanically linked to the movable stylus is a potentiometer, or the like, which translates the stylus movements into corresponding time-varying voltage forms.

Operation of a device such as that disclosed in the Rorden application, supra, entails the use of a motor which presents inertia problems, and causes ensuing time lags with the result that there is overshoot and hunting action in the motion of the stylus which also appear as individual fluctuations in the output voltage. In medium and low speed analog computers the effect of these fluctuations on problem accuracy is generally negligible, the fluctuations being moderately smoothed by the computer, but in high speed computers these fluctuations do not receive as much smoothing and appear in the output.

One object of the invention is to increase the accuracy of an automatic curve follower.

Another and more particular object is to provide an automatic curve translator that will rapidly and accurately translate curves of mathematical functions into time-varying voltages at high speeds and that will be also compatible with slow or medium speed analog computers.

A feature of this invention is a forced vibrating stylus which graphically scans the area on either side of the curve and provides a measure of the changes in the course of the curve, which information it then relays to the stylus directional control apparatus.

An additional feature of the invention is a stylus directional control apparatus which substantially eliminates hunting action in the curve following device by measuring the relative amount of deviation of the curve following device from the curve and applying error signals which decrease in magnitude proportionally over a limited range as the curve following device approaches the curve.

One embodiment of the invention is similar to that of the Rorden application, supra, in that it comprises a chart that moves progressively in one coordinate direction on which the curve to be translated has been outlined by a band of conductive media of which the curve forms a boundary, a conductive stylus to make contact with the band, a motor to drive the stylus reversibly in the second coordinate direction, and a control circuit sensitive to the making and breaking of contact by the stylus and conductive band. In addition, the conductive stylus is mounted on a stylus carriage which moves reversibly in the second coordinate direction, the stylus is forced to vibrate in the second coordinate direction, and in the control circuit an electrical signal integrating amplifier connected to the vibrating stylus and conductive band effectively measures the difference of the stylus' time in contact with the conductive band and its time in contact with the non-conductive chart. When the time measurements are not equal, indicating that the average motion of the stylus for a short interval of time is not on the line of the curve, the stylus carriage and stylus are moved in one of two senses in the second coordinate direction, tending to equalize the time measurements and to make the average position of the stylus conform to the line of the curve. Inasmuch as the motion of the stylus carriage is the average motion of the stylus, it follows the curve and that motion is translated into time-varying voltage forms which correspond to the configuration of the curve.

The nature of the present invention and its various features and objects will appear more fully upon consideration of the accompanying drawings and description.

Figure 1:
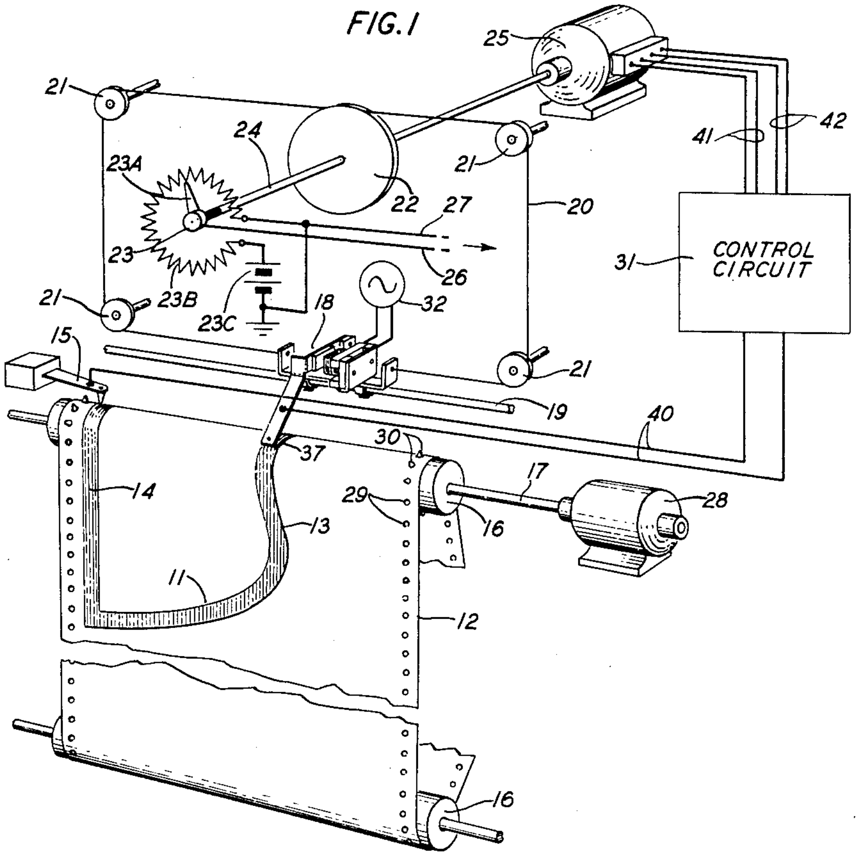
Fig. 1 is a diagrammatic representation of a curve translator system in accordance with the invention.

Referring particularly to Fig. 1, the mathematical function is plotted in this embodiment in rectangular coordinates, on a chart 12, as a curve 13 which is one boundary of a broad conductive band 11 of electrically conductive paint, or the like, that has been applied by the operator. The chart may be of any insulating material such as paper, cloth or plastic. The band may be of any easily applied conductive material, such as colloidal graphite in water, silver paste or graphite applied by lead pencil. The chart itself is held by a pair of parallel spaced rollers 16 which have teeth 30 to engage perforations 29 along the edge of the chart in order to prevent slippage. The chart is driven steadily in one of its coordinate directions, say the X direction, by a motor 28 that is connected to one of the rollers 16.

A stylus unit 18 comprising the stylus carriage 39, stylus holder frame 18A and the vibrating stylus 37, and a fixed rod 19 to which the stylus unit is slidably attached are disposed to allow the stylus to move in contact with the chart 12 in the second coordinate direction, called the Y direction. The stylus unit 18 is driven along the rod in the Y direction by a reversible motor 25 through a drum 22 on the motor shaft 24 and an endless belt 20 that rides over pulleys 21 and the drum 22. The rotary contact 23A of a potentiometer 23 is driven from the motor shaft 24 so that it is rigidly mechanically coupled to the stylus unit 18, and its position is uniquely related to the position of the stylus unit along the rod 19 or in the Y direction. A battery 23C is connected to the terminals of the potentiometer resistor 23B and the output of the potentiometer, which is also the effective output of the curve translator, appears on leads 26 and 27, the lead 26 being connected to the rotary contact 23A and the lead 27 connected to the negative pole of battery 23C and ground. While the mechanical elements of the system are described above in detail, a more complete description of suitable control systems and chart-moving devices may be found in Patents 2,074,118 of March 16, 1937, to Ross et al., and 2,113,164 of April 5, 1938, to A. J. Williams, Jr.

The stylus unit 18 is made to follow the curve 13 as a result of the effect of making and breaking electrical contact with the conductive band 11 by the conductive stylus 37, the latter of which is forced to vibrate at the frequency of the alternating current power from source 32. A stylus circuit 40 provides an electrical connection to the stylus itself and a continuous electrical connection with band 11. In this embodiment, the conductive band 11 is closed on conductive base line 14 with which a fixed conductive stylus 15 maintains contact as the chart progresses in the X direction.

Figure 2:
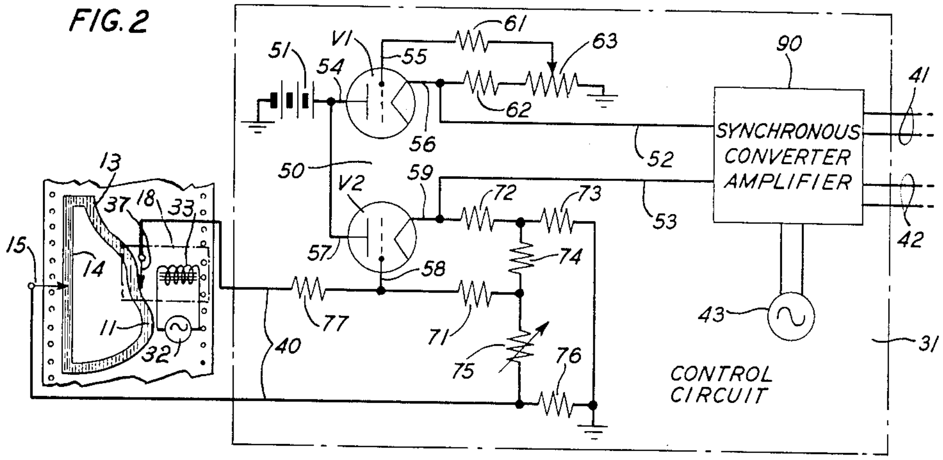
Fig. 2 shows details of the control circuit which is one of the component elements of Fig. 1.
Figure 3A:
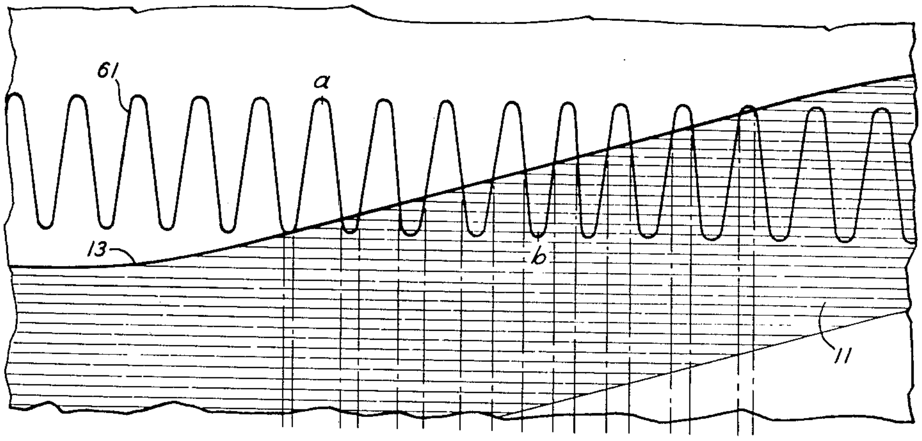
Figs. 3A, 3B, 3C and 3D are explanatory diagrams of various voltages and stylus position relationships appearing in the embodiment.
Figure 3B:
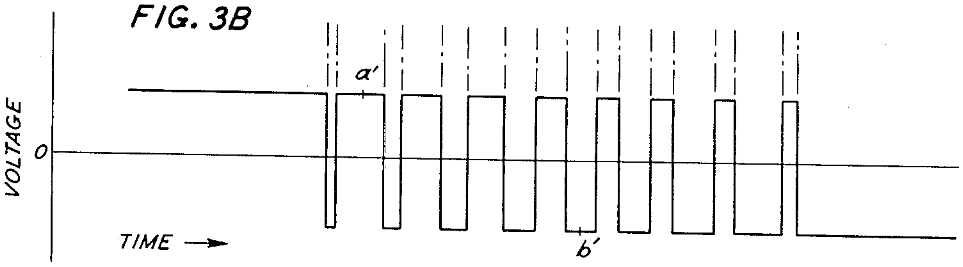

The stylus circuit 40, as illustrated in Fig. 2, is electrically connected to the control circuit 31 which comprises a switching circuit 50 and a converter amplifier 90 with output conductor pairs 41 and 42. The switching circuit operates so long as the stylus circuit 40 is closed to produce across a pair of conductors 52 and 53 a unidirectional voltage of one polarity and fixed amplitude, and a unidirectional voltage of the opposite polarity and of the same fixed amplitude whenever the stylus circuit is open. Thus, if the mean position of the vibrating stylus is on the curve 13, the stylus circuit 40 is interrupted at the vibration frequency, it is opened and closed for equal intervals and the voltage across conductors 52 and 53 takes the form of a rectangular wave that has positive and negative lobes of equal amplitude and duration. If the mean position of the stylus is somewhat displaced from the curve, however, the stylus circuit is opened and closed at the vibration frequency but for unequal intervals and the signal across conductors 52 and 53 is a rectangular wave of which the positive lobes will be of longer or shorter duration than the negative lobes depending upon the direction of stylus displacement from the curve. These conditions are represented diagrammatically in Figs. 3A and 3B where, in Fig. 3A, 61 represents the actual instantaneous path of the vibrating stylus 37 as the chart progresses at a continuous speed from right to left or in the X direction, 11 the conductive band, and 13 the band boundary for the curve, points *a* and *b* being, respectively, a point in the path 61 on the non-conductive chart, and a point on the conductive band. In Fig. 3B the voltages across conductor pairs 52 and 53 are shown, the point *a* representing a positive lobe voltage at a time when the stylus is off the band and the stylus circuit 40 is open, and point *b* representing a negative lobe voltage at a time when the stylus is on the band and the stylus circuit is closed. It will be understood that if the stylus is so far displaced from the curve that the stylus does not make contact with the curve, the stylus circuit remains open or closed and the voltage across conductors 52 and 53 is either a positive or negative voltage, depending upon whether the stylus is on or off the band.

Conductors 52 and 53 are connected to synchronous converter amplifier 90 of well-known from through which alternating current power from source 43 is supplied to the output conductor pairs 41 and 42 in varying strength and in one relative phase or another. The voltages in the conductor pairs are of the same frequency as that of the power source 43, and the phase and amplitude of the voltage in one pair is fixed, but in the other pair the phase and amplitude varies respectively as the polarity of the average voltage and average magnitude of the voltage in conductors 52 and 53. The direction of rotation of the two-phase motor 25 to which the conductor pairs 41 and 42 are connected depends upon the relative phase of the alternating current power in the conductor pairs, so that the motor will tend to cause rotational motion in one sense when the mean position of the stylus 37 is on the conductive band 11, and in the opposite sense when the mean position of the stylus is on the non-conductive chart 12. The amplitude of the driving voltage depends upon the displacement of the mean stylus position from the boundary of the conductive band. The control circuit is illustrated in detail in Fig. 2.

In the control circuit 31, the switching circuit 50 comprises two cathode followers of triode tube $V_1$ and $V_2$, both plate elements of which are connected to the positive pole of a battery 51. The cathode of $V_1$ is connected to a conductor 52 and to ground through a fixed resistor 62 and a potentiometer 63, the rotary contact of which is connected to the grid of $V_1$ through resistor 61. The cathode of $V_2$ is connected to the conductor 53 and to the series resistor unit made up of resistors 72 and 73, the latter of which is shunted to ground through the fixed resistor 74, a variable resistor 75 and a fixed resistor 76 connected in series. The fixed stylus 15 of stylus circuit 40 is also connected to resistors 75 and 76, and the resistors 74 and 75 are connected to the grid of $V_2$ through resistor 71, which is also connected to the stylus 37 of stylus circuit 40 through resistor 77.

In this arrangement, the cathode follower tube $V_1$ is biased so that for any one setting of the balancing potentiometer 63, the potential to ground in conductor 52 is constant, and the cathode follower tube $V_2$ is biased so that the potential with respect to ground in conductor 53 is constant for any one setting of resistor 75 when the stylus circuit is open. The values of the resistors in both cathode followers are chosen so that under the above operating conditions, the potential in conductor 53 is positive with respect to the potential in conductor 52. Under such conditions, the potential between the grid and the cathode of $V_2$ is less than that of the grid and cathode of $V_1$. However, when the stylus circuit 40 is closed, the potential between the grid and cathode of $V_2$ increases with respect to that in $V_1$, and the potential in conductor 53 decreases with respect to that in conductor 52, thereby causing conductor 53 to become negative with respect to conductor 52.

The potentiometer 63 and variable resistor 75 are inserted for purposes of control. With the amplitude control 75 set at minimum resistance and the stylus circuit 40 open, the balancing potentiometer 63 is adjusted until the potential difference between the conductors 52 and 53 is zero. The amplitude control 75 is then adjusted to establish the desired potential difference between the conductors 52 and 53. In this embodiment, that potential difference was selected at 0.050 volts. The potential difference is determined by considering along with other factors the slope of the curve to be translated, the tracking speed of the stylus, and the amplitude and frequency of the vibrating stylus.

While other values might be substituted, the values used in one instance in practice were:

| | | |
|---|---|---|
| Tube $V_1$ | | ½2C51 |
| Tube $V_2$ | | ½2C51 |
| Source 51 | volts | 100 |
| Resistor 61 | megohm | 1 |
| Resistor 62 | ohms | 2000 |
| Resistor 63 | do | 200 |
| Resistor 71 | megohm | 1 |
| Resistor 72 | ohms | 2000 |
| Resistor 73 | do | 200 |
| Resistor 74 | do | 2200 |
| Resistor 75 | do | 25,000 |
| Resistor 76 | do | 2200 |
| Resistor 77 | do | 10,000 |

Figure 3C:
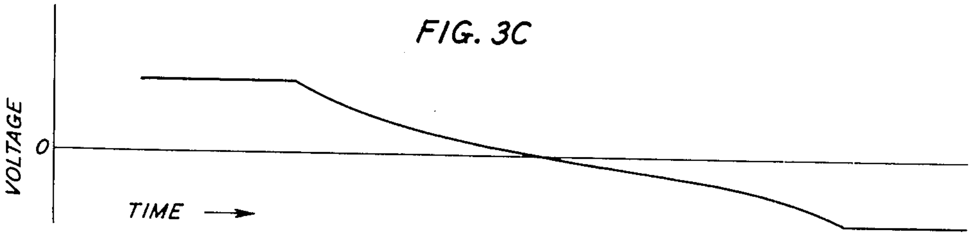

The rectangular wave signal from conductors 52 and 53 as shown in Fig. 3B, is fed into the synchronous converter amplifier 90, which first integrates the signal as shown in Fig. 3C, and then causes the integrated signal to control the relative phase and amplitude of the alternating current power which it supplies to the two-phase motor 25 through conductor pairs 41 and 42. Fig. 3C is not meant to show the actual voltage form of Fig. 3B as integrated by the converter amplifier 90, but it does generally illustrate how the integrated voltage form varies with time as the stylus moves from an "off" the conductive band position to an "on" the conductive band position, as shown in the sequence of Fig. 3A.

Figure 3D:
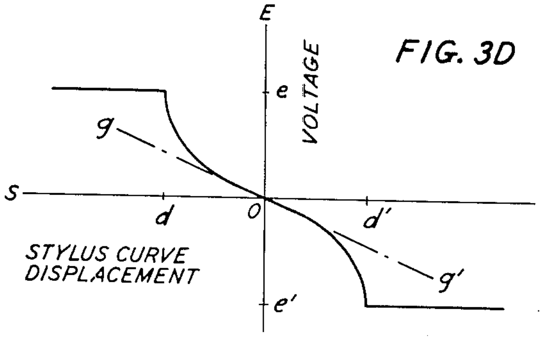

If the mean stylus displacement from the boundary of the conductive band is plotted against the relative voltage in conductor pairs 41 and 42, a curve similar to that shown in Fig. 3D results. According to the figure, if the mean stylus displacement $s$ on either side of the band is large and equal to or greater than the amplitude $d$ of the vibrating stylus motion, the relative voltage E in the conductor pairs is $e$ or equal to the maximum integrated voltage as shown in Fig. 3C. As the means stylus displacement $s$ varies from $d$ to zero, E varies to zero according to the Fig. 3D. For displacements of the mean stylus position from the boundary of the band which are small compared to the amplitude $d$ of the stylus, the voltage in the conductor pairs is substantially proportional to the displacement as illustrated by the dotted lines $gg'$.

A suitable converter amplifier is described in Patent 2,485,948 of October 25, 1949, to A. J. Williams, Jr., et al., and is incorporated in the Speedomax Type G double element recorder made by the Leeds and Northrup Company. This recorder also comprises a suitable mechanical control system and chart-moving device.

Figure 4:
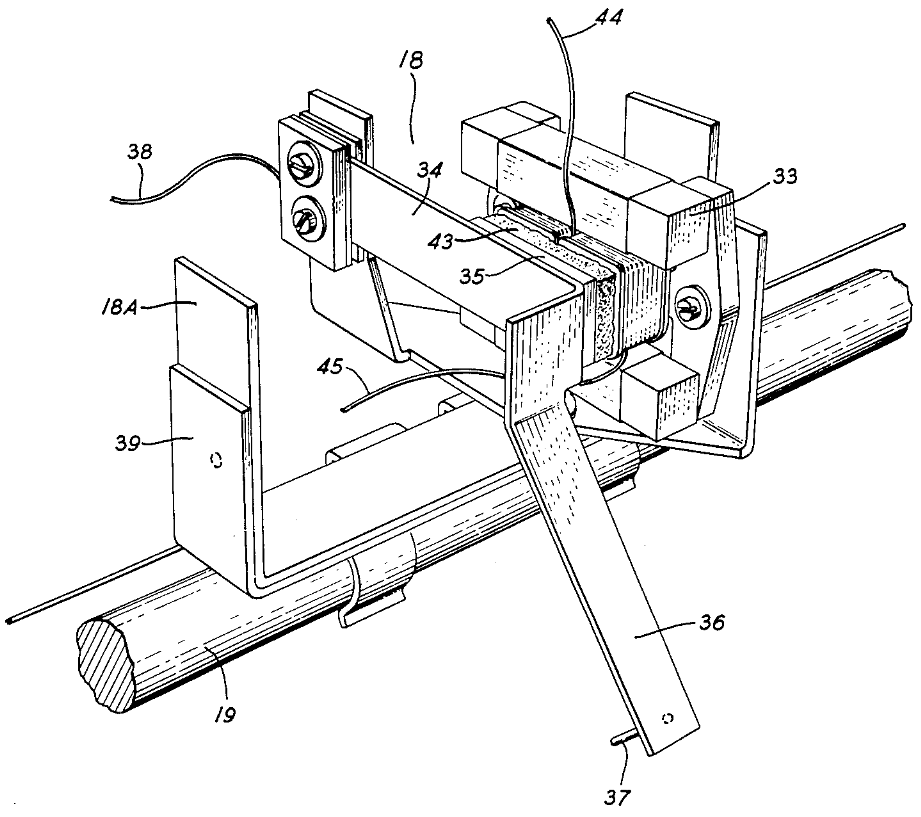
Fig. 4 shows in detail the construction of the vibrating stylus unit of Fig. 1.

The vibrating stylus unit 18 is, in this embodiment of the invention, as illustrated in Fig. 4. Stylus holder frame 18A fits into the stylus carriage 39, which in turn rides on rod 19, and the frame has attached to it an electromagnetic driver 33 and conductive reed 34, the latter having rigidly connected to it an armature plate 35 and a conductive arm 36 into which the conductive stylus 37 is fixed. The unit is arranged with the armature plate in close proximity to, and in the magnetic field of, the electromagnetic driver and the stylus 37 in contact with the chart 12, so that under operating conditions when an alternating current source 32 is applied to the electromagnetic driver through conductors 44 and 45, the resulting alternating magnetic field will cause the reed to vibrate at the same frequency as the source and drive the stylus reversibly across the face of the chart in the second coordinate, or Y, direction. A suitable electromagnetic driver is described in Patent 2,220,942 of November 12, 1940, to L. A. Morrison, et al. and is incorporated in the HA–1 telephone receiver unit made by Western Electric Company, Incorporated. The alternating current source 32 may be of any compatible voltage and of a frequency to meet the needs of the curve translating problem. In this one instance in practice, a 60-cycle source was used. Conductor 38, connected to the conductive reed 34, provides electrical contact between the stylus 37 and the stylus circuit 40, and for damping effect, a non-conducting padding material 79 is fixed to the armature plate between the driver and the armature plate. The conductive reed 34 may be tuned to any suitable frequency and was in this example in practice tuned to approximately 60 cycles and so placed in the vibrating stylus unit as to give the stylus vibrating motion of a width of one-sixteenth of an inch when used with 10-inch wide Leeds and Northrup Speedomax chart paper.

In this embodiment, the conductive curve is a broad band of conductive material that is electrically closed on itself and of a resistance that is small compared to one megohm. However, the area between the curve and the base line may be completely coated with the conductive medium, or the curve may be of any other arrangement or configuration which will properly define the curve, permit continuous electrical contact to be maintained with the curve, and be of a resistance that is operationally compatible with the electrical circuit to which it is connected. Although the chart holder drive has been described as providing progressive motion in the X coordinate direction, further provision may be made if desired for reversal of the direction of such motion and such motion may be controlled as any arbitrary function of time.

The vibration frequency of the stylus is determined by many factors including the integrating time constant of the converter amplifier, the desired curve tracking speed, the mass and stiffness of the reed, the required amplitude of stylus vibratory motion and the frictional resistance of the stylus with the chart. The 60-cycle per second vibration frequency in this embodiment was chosen because of operational needs, availability and convenience. Any frequency which is high compared to the content of the curve signal which the stylus is supposed to follow would be satisfactory.

In one instance in practice where a curve 10 inches long on standard Leeds and Northrup Speedomax paper was translated into voltage forms and then recorded by a Speedomax Recorder, the reproduced form was found to vary from the original by a maximum of 1.3 per cent of the full scale, and an average of 0.4 per cent of the full scale.

It is understood that this invention is not limited to the specific arrangements here described and that modifications and changes may be made without departing from the spirit or scope of the invention.

What is claimed is:

1. An automatic curve follower adapted to track the boundary between conductive and non-conductive portions of the surface of a chart comprising a holder for the chart, a stylus carriage on which an electrically conductive stylus is carried in contact with said chart, said chart holder and stylus carriage being mounted for relative movement in two rectangular coordinate directions, a driving motor connected to said chart holder for providing movement to the chart according to a predetermined function of time in one of said rectangular coordinate directions, a reversible motor connected to the stylus carriage for providing a reversible movement in the second rectangular coordinate direction, a vibrator to give the stylus vibratory motion across the chart in the second rectangular coordinate direction, a control circuit producing motor directional signals that tend to correct the motion of the reversible drive each time the make and break contact periods of said stylus and said conductive portion are not equal, comprising a stylus circuit one side of which is connected to the stylus and the other of which is arranged to maintain electrical contact with said conductive portion, and means responsive to the relative position of the stylus carriage along the second coordinate direction for providing corresponding variable voltage forms.

2. An automatic curve translator comprising an automatic curve follower according to claim 1, in which the control circuit includes a switching circuit directly responsive to the making and breaking of contact by the vibrating stylus and conductive band, and means to make the magnitudes of the directional signals to the reversible motor dependent upon the time differences in the make and break contact periods of said stylus and conductive portion.

3. An automatic curve translator comprising, as a first element, an automatic curve follower adapted to track the boundary between conductive and non-conductive portions of the surface of a chart and, as a second element, means responsive to variations in the relative positions of the curve follower to a fixed line on the chart for providing corresponding variable voltage responses, said first element comprising an insulated chart coated with an electrical conductive medium, a holder for the chart and driving means for giving the chart motion in one rectangular coordinate direction, a stylus carriage including a rack on which said stylus carriage is mounted and can move in the second coordinate direction, an electrical conductive stylus mounted on said carriage and adapted to make contact with said chart, a reversible drive for providing reversible motion to the stylus carriage in the second rectangular coordinate direction comprising a reversible driving motor attached to said stylus carriage, an electromagnetic driver and armature to vibrate the stylus in the second coordinate direction across the face of the chart, and a control circuit that tends to correct the motion of said carriage drive each time the make and break contact periods of said stylus and conductive portion are not equal comprising an electrical stylus circuit one side of which is connected to the vibrating stylus and the other side of which is arranged to maintain contact with said conductive portion, a switching circuit which emits a signal of a given polarity when the electrical stylus circuit is open and of an opposite polarity when the electrical circuit is closed and a synchronous signal frequency converter and amplifier for translating the switching circuit signals into motor directional signals of magnitudes dependent upon the time differences in the make and break contact periods of said stylus and conductive portion, said second element comprising a variable potentiometer mechanically linked to said stylus carriage for delivering voltages varying with the relative position of the stylus carriage along the second coordinate direction as the chart progresses in the first coordinate direction.

4. An automatic curve translator comprising an automatic curve follower according to claim 1 in which the control means includes a switching circuit comprising a first cathode follower amplifier for providing a first value of potential output and a second cathode follower amplifier for providing a second value of potential output, said second cathode follower amplifier adapted to have a value of cathode potential output of one polarity with respect to said first cathode follower output when said electrical stylus circuit is open and value of cathode potential of opposite polarity with respect to said first cathode follower potential when said electrical stylus circuit is closed, and means responsive to the polarity of said signals to make the magnitudes of the directional signals to the reversible motor dependent upon the time differences in the make and break contact periods of said stylus and conductive portion.

5. An automatic curve translator according to claim 3 in which said switching circuit comprises a first cathode follower amplifier for providing a first value of potential output and a second cathode follower amplifier for providing a second value of potential output, said second cathode follower amplifier adapted to have a value of cathode potential output of one polarity with respect to said first cathode follower output when said electrical stylus circuit is open and value of cathode potential of opposite polarity with respect to said first cathode follower potential when said electrical stylus circuit is closed.

References Cited in the file of this patent

UNITED STATES PATENTS

| | | |
|---|---|---|
| 2,121,211 | Padva et al. | June 21, 1938 |
| 2,262,354 | Cates | Nov. 11, 1941 |
| 2,354,391 | McCourt | July 25, 1944 |
| 2,489,305 | McLennan | Nov. 29, 1949 |
| 2,588,386 | Hubbard et al. | Mar. 11, 1952 |
| 2,594,716 | Bailey | Apr. 29, 1952 |
| 2,598,937 | Parker | June 3, 1952 |
| 2,611,115 | Johnston | Sept. 16, 1952 |
| 2,611,887 | Lobosco | Sept. 23, 1952 |
| 2,622,871 | Martin | Dec. 23, 1952 |